Dec. 31, 1940. E. A. RUTENBER 2,226,781
SUPPORT FOR ELECTRIC HEATING ELEMENTS AND METHOD OF MAKING SAME
Filed Sept. 21, 1939 2 Sheets-Sheet 1
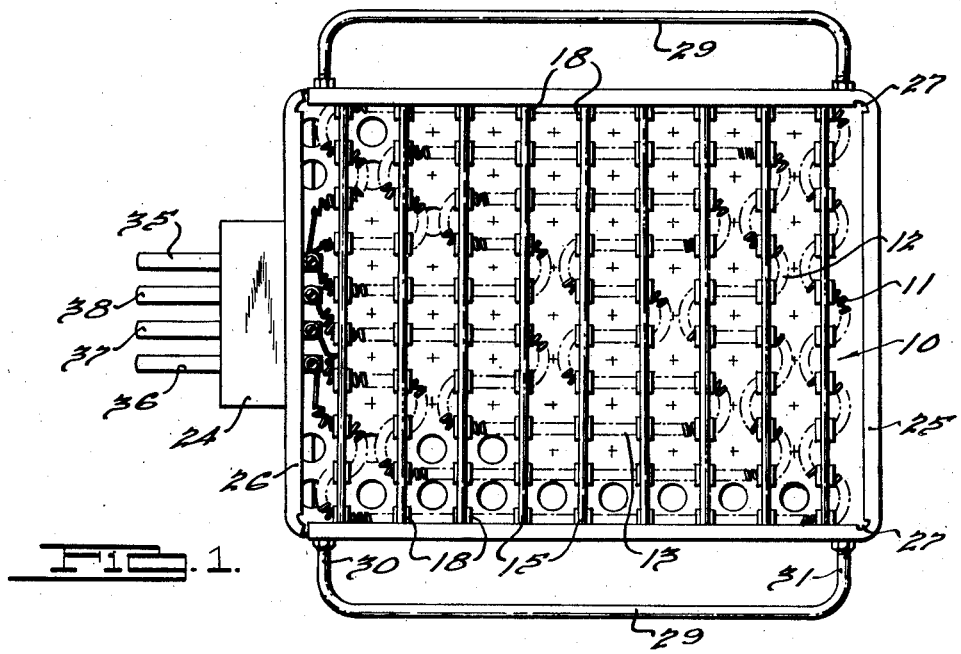
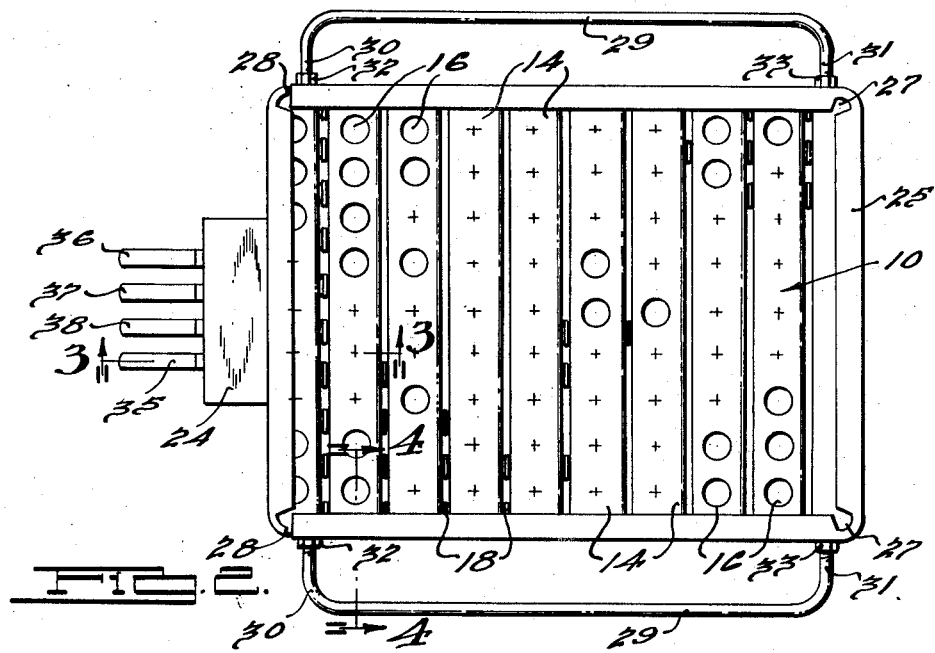
INVENTOR
Edwin A. Rutenber
BY
Carroll R. Taber
ATTORNEY

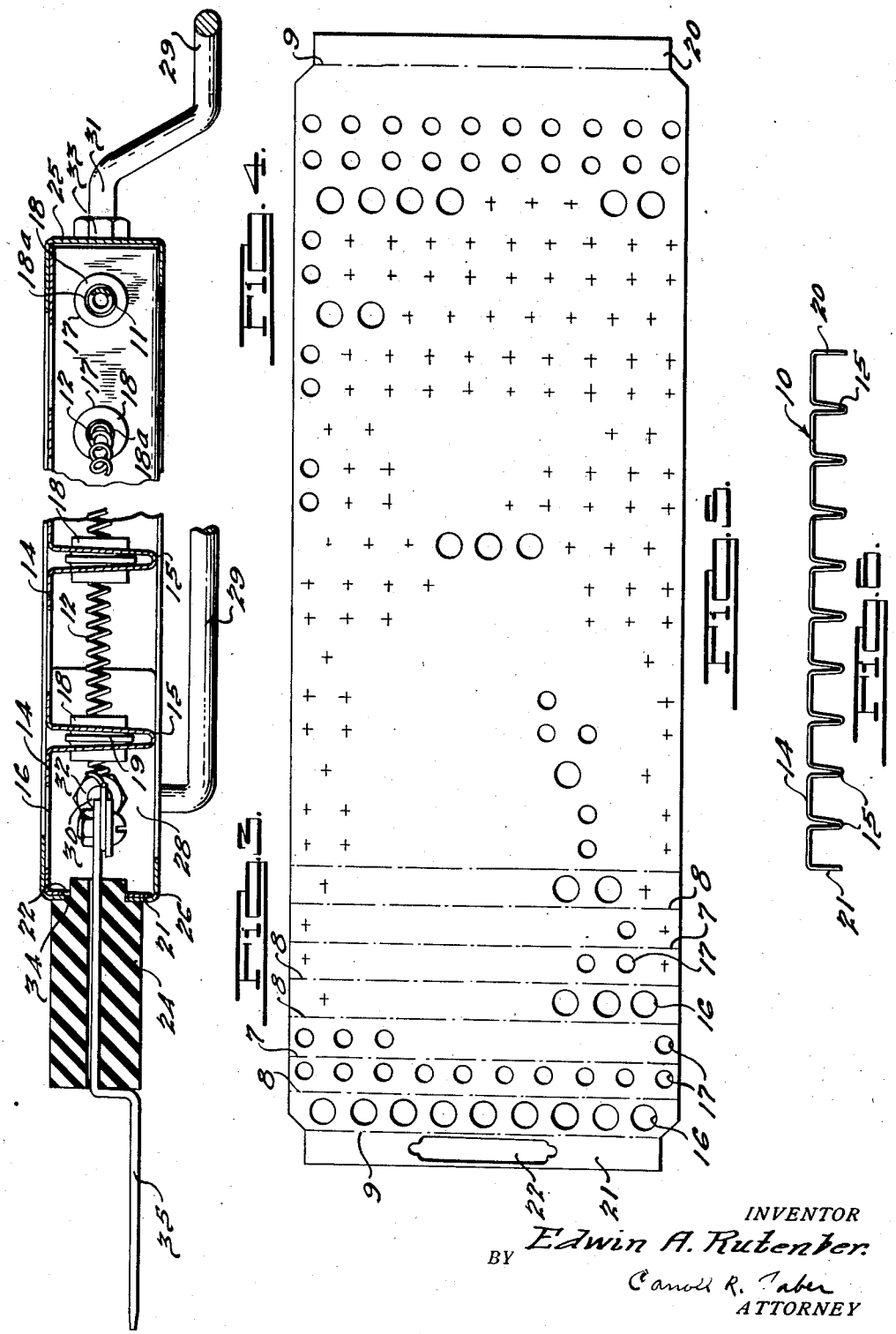

Patented Dec. 31, 1940

2,226,781

UNITED STATES PATENT OFFICE 2,226,781

SUPPORT FOR ELECTRIC HEATING ELEMENTS AND METHOD OF MAKING SAME

Edwin A. Rutenber, Greenville, Mich., assignor to Gibson Electric Refrigerator Corporation, Greenville, Mich., a corporation of Michigan Application September 21, 1939, Serial No. 295,899

5 Claims. (Cl. 219—19)

This invention relates to electric heating element supports and the processes for making them.

It is an object of this invention to provide a simple and economically manufactured one-piece support for electric heating elements. Another object of the invention is to provide a novel method of making a one-piece heating element support from a single flat sheet of metal.

These objects are attained by providing a single rectangular sheet of metal, punching a plurality of holes in the metal sheet which are arranged in transverse rows and longitudinal columns, the transverse rows being grouped in pairs with a wider space between the pairs of rows than between the rows in each pair, folding the metal along transverse lines between the two rows of holes in each pair of rows to provide a plurality of longitudinally spaced apart V-shaped channels which have a single row of holes in each leg thereof, and installing insulators in each longitudinally aligned pair of openings in the opposite legs of each channel.

In order to provide for heat transfer and circulation of air, transversely extending rows of holes are formed in the webs which connect adjacent channels. Preferably, all the holes are formed in the flat sheet before it is folded as described above.

For a more detailed description of the invention reference is made to the following specification and the accompanying drawings, wherein:

Figure 1 is a bottom plan view of an oven heating unit embodying this invention;

Figure 2 is a top plan view of the unit shown in Figure 1;

Figure 3 is a fragmentary sectional view taken on substantially the line 3—3 of Figure 2;

Figure 4 is a fragmentary sectional view taken on substantially the line 4—4 of Figure 2;

Figure 5 is a plan view of a sheet metal blank from which the support for the heating element is fashioned; and Figure 6 is a side elevational view of the heating element support after it has been folded and bent to final shape.

The present invention is shown as embodied in the heating unit for an oven of an electric range. The unit comprises a heating element support 10 carrying insulators 18 to hold the heating coils 11, 12 and 13; a frame 25 and 26 of channel shaped cross-section surrounding the support; a pair of hangers 29; and a terminal block 24 carrying terminal plugs 35, 36, 37 and 38.

The part of the heating unit to which this invention particularly relates is the support 10 for the heating elements. It comprises a plurality of downwardly extending transversely arranged V-shaped channels 15, separated from each other by webs 14. At the opposite ends of the support 10 are downwardly extending flanges 20 and 21, the latter having an opening 22 therein.

Each channel is provided with a row of openings 17 in each leg thereof. Each opening in each leg of each channel is arranged in longitudinal alignment with an opening in every other leg of all the channels.

The webs 14 of the support 10 are provided with rows of openings 16 to permit heat generated by the heating elements to radiate and circulate freely throughout the oven. Preferably the openings 16 are larger than the openings 17, although it will be obvious that the openings 16 may be made of any desired size.

In each pair of aligned openings in the opposite legs of each channel 15 are insulators 18. The insulators have ribs 19 intermediate their ends positioned between the legs of the channels 15 to prevent removal of the former from the openings 17. In each insulator is an opening 18a for the reception of a heating element. The heating elements 11, 12 and 13 above mentioned are threaded through the openings 18a in the insulators in the manner indicated in Figure 1, and their ends are brought out adjacent the flange 21.

The edges of the support 10 are embraced by a frame composed of strips 25 and 26 of channel shaped cross-section. The side flanges of the strip 25 are notched at 27 and the latter is bent into U-shape (see Figures 1 and 2). The other strip 26 of the frame has its flanges cut away at the ends, and the web 28 which remains is bent at right angles to the central part of the strip and is joined in overlapping relation to the web of the strip 25.

The two strips 25 and 26 are held together by the ends 30 of a pair of hangers 29 formed from metal rods bent to the shape shown in Figures 1 to 4. The ends are threaded and inserted in openings in the overlapping webs 25 and 26 and secured there by nuts 32. The other ends 31 of the hangers are secured solely to the web of the strip 25 by nuts 33.

Secured in the opening 22 of the flange 21, and a complementary opening 34 in the strip 26 is a terminal block 24 composed of insulating material. The block 24 carries four terminal plugs 35, 36, 37 and 38 which are adapted for insertion in sockets at the back of the oven in order to make proper connection with a suitable source of electric current. The inner ends of the terminal plugs are secured to the ends of the heating coils or heating elements 11, 12 and 13, in the manner shown in Figure 1.

The support 10 previously described is formed from a single sheet metal blank of the shape shown in Figure 5, which is stamped in a suitable punch press to provide a series of transversely extending rows of openings 16 and 17. The openings 16 are larger than the openings 17. The openings 17 are equi-distantly spaced in the rows. The rows of openings 17 are arranged in pairs with a row of openings 16 between each pair of rows of openings 17. Preferably two rows of openings 17 and one row of openings 16 are formed in one operation of the press, although it will be apparent that by the use of suitable dies all of the openings may be formed at one time. When the openings are punched three rows at a time the blank is moved the requisite distance after each operation of the press and the punching operation is repeated until the required number of rows of openings are formed. In addition, the opening 22 is formed in one end of the blank while the latter is in the flat state.

After the openings 16, 17 and 22 are punched in the blank, it is folded along the lines marked 7, 8 and 9 into the cross-sectional shape shown in Figure 6 and previously described. The bottoms of the channels 15 are formed by bending the blank along the fold lines 7, while the apices of the angles between the legs of the channels 15 and the intermediate webs 14 are formed along the fold lines 8. The end flanges 20 and 21 are formed by bending the ends of the blank along the lines 9.

By folding the blank in the manner just described each opening 17 in each row is aligned with a corresponding opening in each of the other rows so that in the finished support the channels 15 are pierced by a series of longitudinally aligned openings extending the length of the support. The openings 16 are thus located in the webs 14 intermediate the channels 15.

The blank 10 comprises metal of sufficient flexibility that it may be flexed after the channels 15 have been formed to permit the insertion of the insulators 18. When the frame is attached to the support 10 the insulators 18 are permanently locked in place. After the insulators 18 have been placed in the support and the support has been attached to the frame, the heating coils are threaded into the openings 18 in the insulators.

From the foregoing it will be seen that the invention provides a sturdy and rigid support for the heating elements of an electric oven, and because it is made in one piece from a single sheet of metal the support is easily fabricated and assembled.

The scope of the invention is indicated in the appended claims.

I claim:

1. In an electric heating unit, a one piece support for an electric heating element comprising a plurality of V-shaped channels having flexible side walls and pairs of aligned unconnected openings extending therethrough, and a tubular insulator in each pair of openings, said insulators having radial ribs intermediate their ends positioned between the channel side walls and having their ends projecting through the respective openings in the opposite side walls.

2. In an electric heating unit, a one piece support for an electric heating element comprising a plurality of V-shaped channels having flexible side walls arranged in parallel relation and connected by horizontal coplanar webs, opposite side walls of each channel having pairs of aligned unconnected openings therethrough, and a tubular insulator in each pair of openings, said insulators having radial ribs intermediate their ends positioned between the channel side walls and having their ends projecting through the respective openings in the opposite side walls.

3. The method of making a one piece support for electric heating elements, which includes the steps of providing a substantially rectangular blank of flexible metal, forming therein a plurality of spaced transversely extending pairs of rows of openings, said openings being of equal size and equi-distantly spaced in the rows, the space between the adjacent pairs of rows being greater than the space between the rows in each pair, folding the blank intermediate the rows of each pair of rows whereby to form a plurality of parallel V-shaped channels having a row of openings in each leg thereof arranged in alignment with the corresponding row in the other leg, thereafter flexing the legs of the V-shaped channels apart, installing an insulator in each aligned pair of openings in the opposite legs of each channel, and finally returning the legs of the channel to their initial positions.

4. The method of making a one piece support for electric heating elements, which includes the steps of providing a substantially rectangular blank of flexible metal, forming therein a plurality of spaced transversely extending pairs of rows of openings, said openings being of equal size and equi-distantly spaced in the rows, the space between the adjacent pairs of rows being greater than the space between the rows in each pair, folding the blank intermediate the rows of each pair of rows whereby to form a plurality of parallel V-shaped channels having a row of openings in each leg thereof arranged in alignment with the corresponding row in the other leg, thereafter flexing the legs of the V-shaped channels apart, installing a tubular insulator having a radial rib intermediate its ends in each aligned pair of openings in the opposite legs of each channel with the rib between the legs of the respective channel, and finally returning the legs of the channels to their initial positions.

5. The method of making a one piece support for electric heating elements, which includes the steps of providing a substantially rectangular blank of flexible metal, forming therein a plurality of spaced transversely extending pairs of rows of openings, said openings being of equal size and equi-distantly spaced in the rows, folding the blank intermediate the rows of each pair of rows whereby to form a plurality of parallel V-shaped channels having a row of openings in each leg thereof arranged in alignment with the corresponding row in the other leg, thereafter flexing the legs of the V-shaped channels apart, installing an insulator in each aligned pair of openings in the opposite legs of each channel, and finally returning the legs of the channel to their initial positions.

EDWIN A. RUTENBER.